M. PARIDON.
MACHINE FOR MAKING BOXES.
APPLICATION FILED JUNE 15, 1915.
1,206,899.
Patented Dec. 5, 1916.
6 SHEETS—SHEET 4.
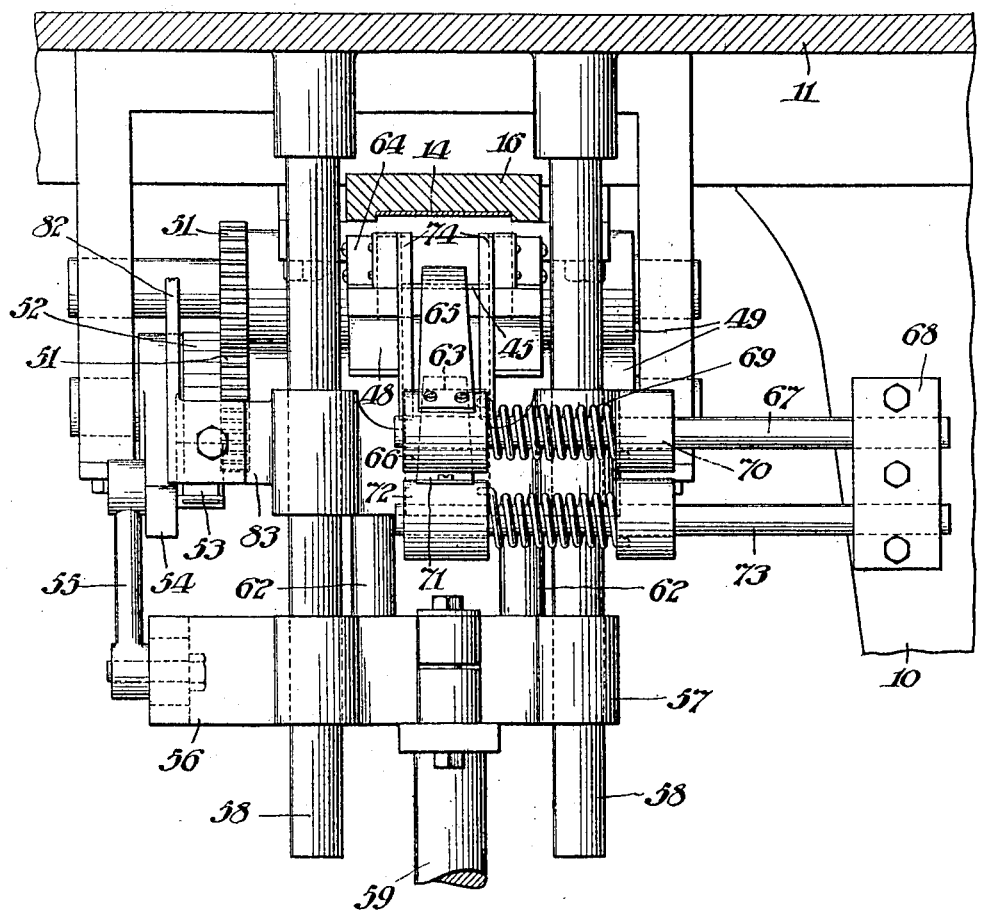
Fig. 7.
Fig. 9.
Fig. 8.
Inventor:
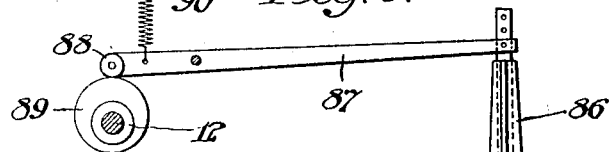
Michael Paridon,
By John R. Nolan
Attorney M. PARIDON.
MACHINE FOR MAKING BOXES.
APPLICATION FILED JUNE 15, 1915.
1,206,899.
Patented Dec. 5, 1916.
6 SHEETS—SHEET 5.
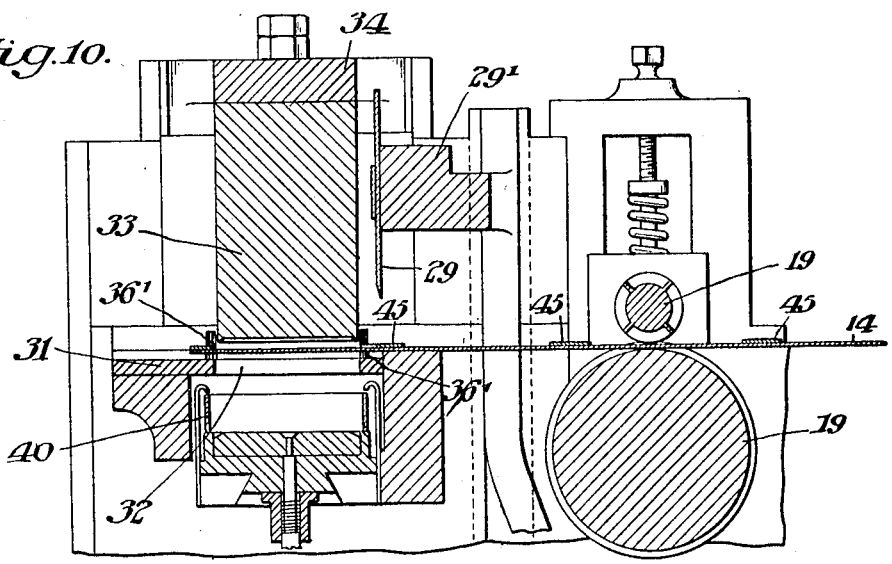
Fig. 10.
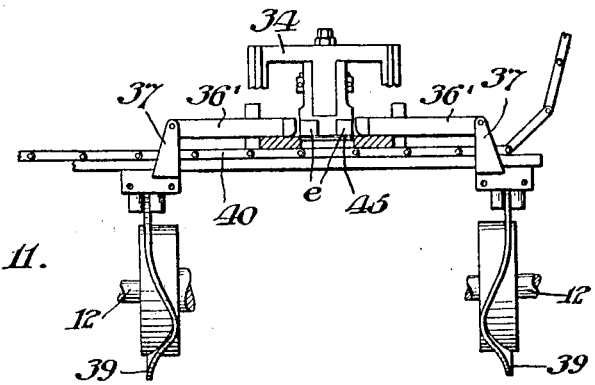
Fig. 11.
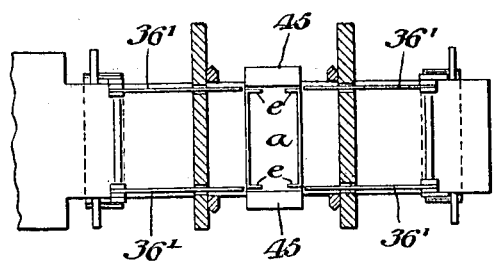
Fig. 11ª
Inventor:
Michael Paridon
By John R. Nolan
Attorney

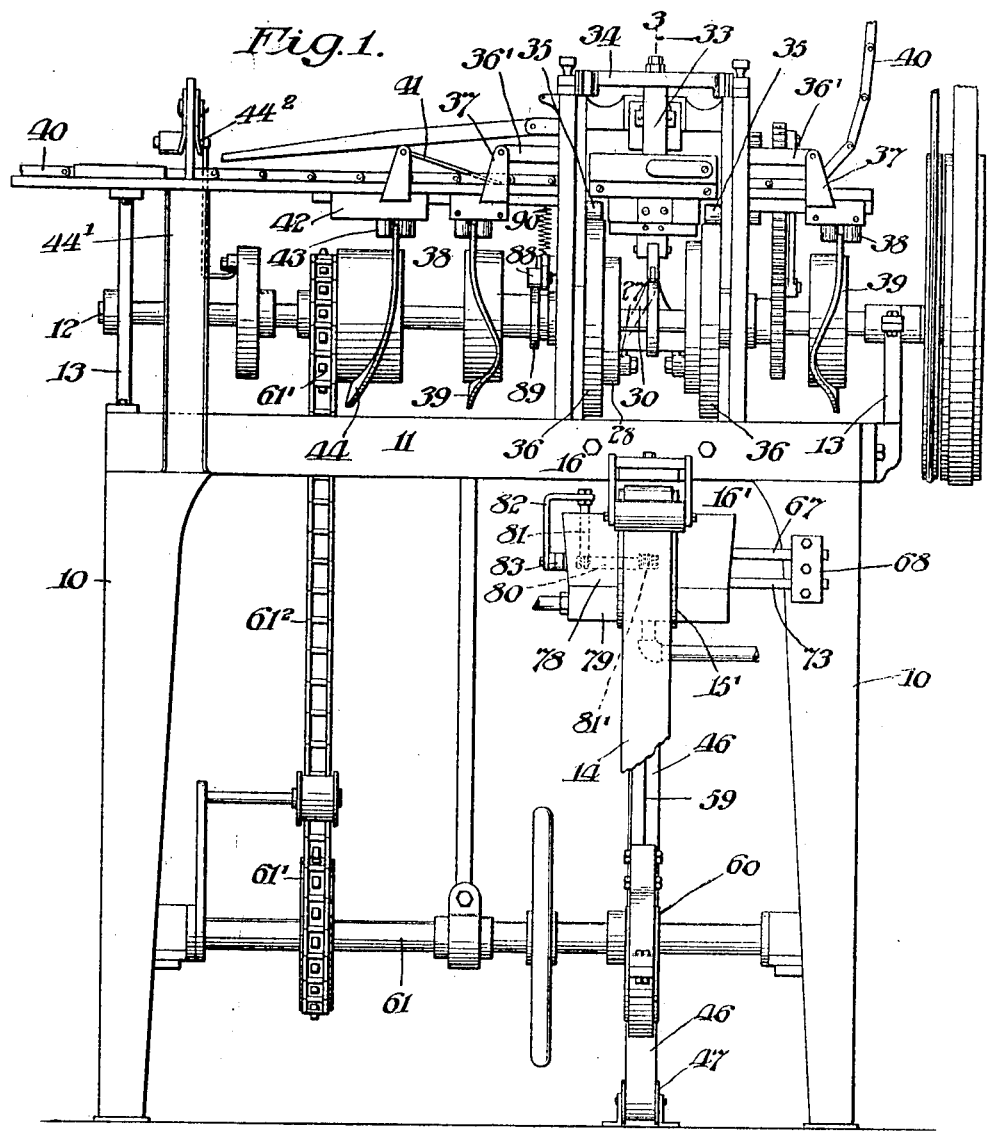

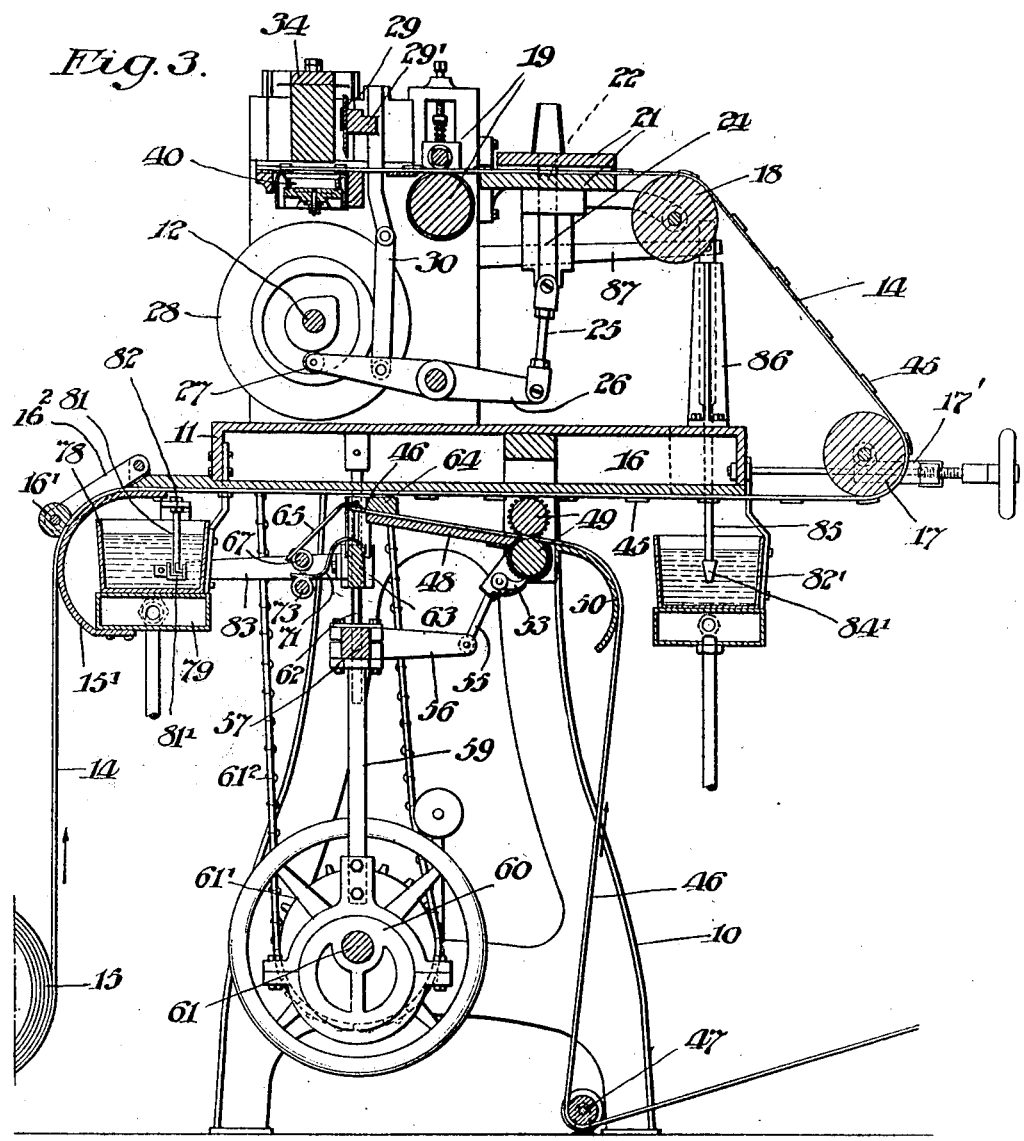

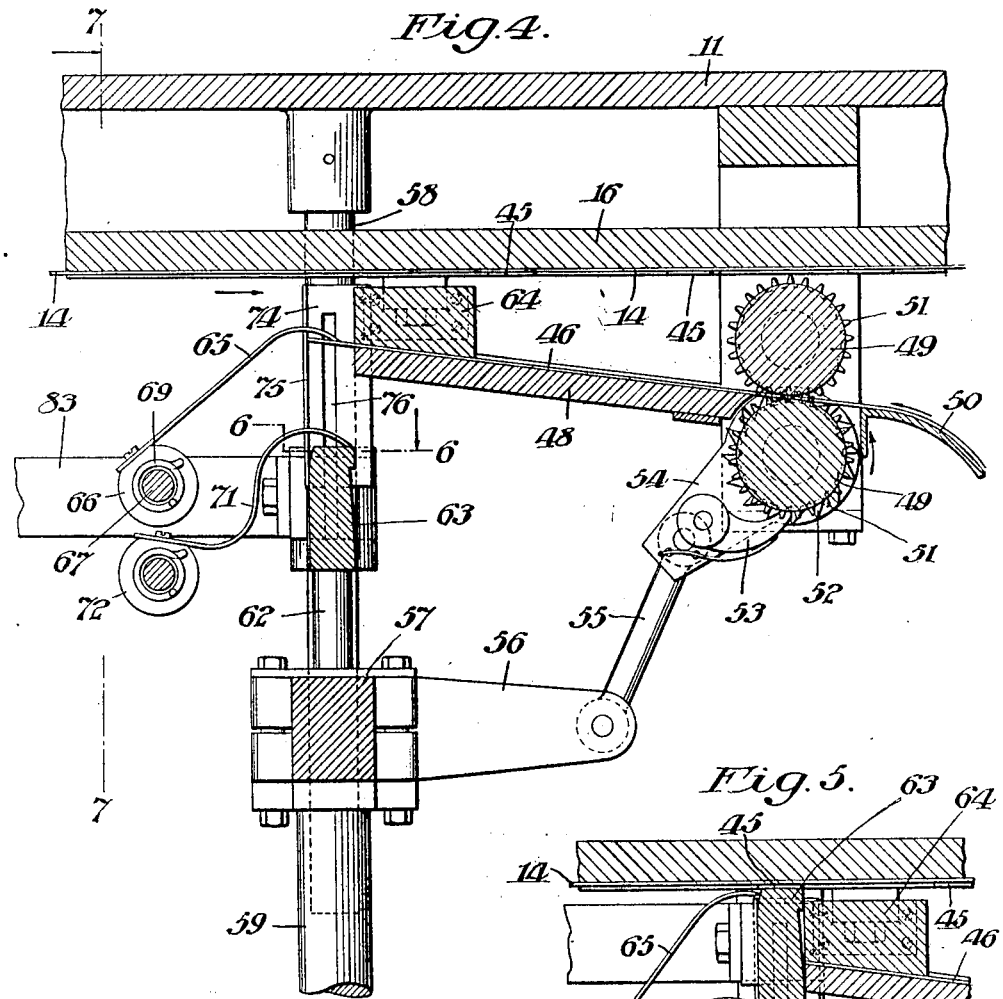

M. PARIDON.
MACHINE FOR MAKING BOXES.
APPLICATION FILED JUNE 15, 1915.

1,206,899.

Patented Dec. 5, 1916.
6 SHEETS—SHEET 6.

Inventor:
Michael Paridon

By John R. Nolan
Attorney

UNITED STATES PATENT OFFICE.

MICHAEL PARIDON, OF BARBERTON, OHIO, ASSIGNOR TO THE DIAMOND MATCH COMPANY, OF CHICAGO, ILLINOIS, A CORPORATION OF ILLINOIS.

MACHINE FOR MAKING BOXES.

1,206,899.  Specification of Letters Patent.  Patented Dec. 5, 1916.

Application filed June 15, 1915. Serial No. 34,142.

*To all whom it may concern:*

Be it known that I, MICHAEL PARIDON, a citizen of the United States, and resident of Barberton, in the county of Summit and State of Ohio, have invented certain new and useful Improvements in Machines for Making Boxes, of which the following is a specification.

This invention relates to machines for making boxes, and more especially machines of that class whereby a strip of paste-board or the like is progressively drawn from a roll and advanced through the box making path, including means whereby glue is applied to the strip at intervals; means whereby the strip is appropriately slitted, scored and cut into box blanks; means whereby the blanks are folded into box form and are deposited thus folded into the hollow links of an intermittently movable endless chain which holds them until the glue hardens, and means whereby the completed boxes are discharged from the links. A machine of this class is illustrated in Letters Patent of the United States No. 554,975, dated February 18, 1896, to which reference may be had.

The present invention is herein illustrated in the nature of an attachment to the said patented machine whereby reinforcing sections are successively applied to the strip in such relation to each other that when the blanks are cut from the strip and converted into boxes the end walls of the boxes thus produced are thickened and stiffened.

Figure 12:
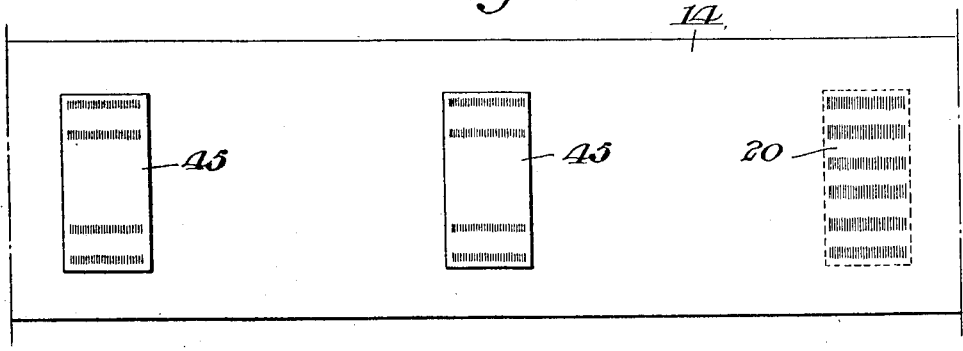
Figure 13:
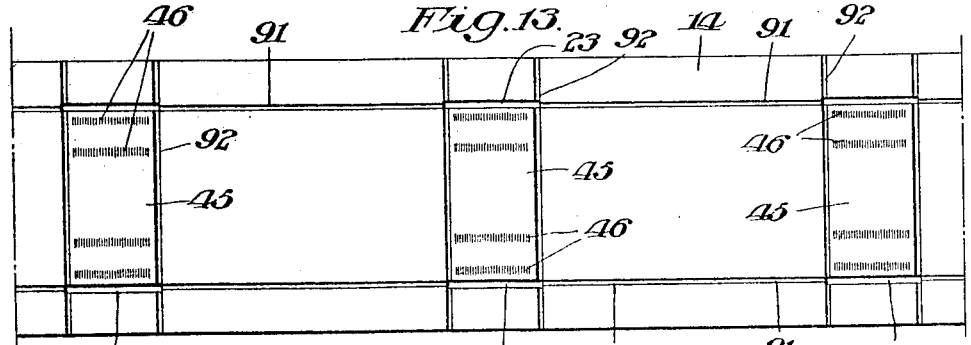
Figure 14:
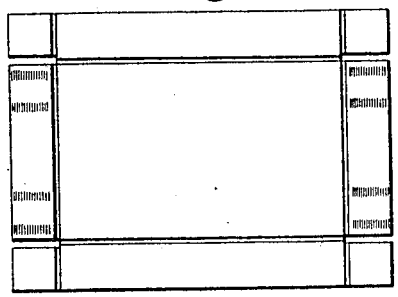
Figure 15:
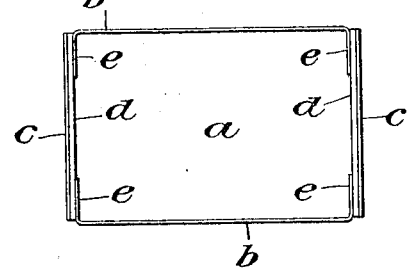
Figure 16:
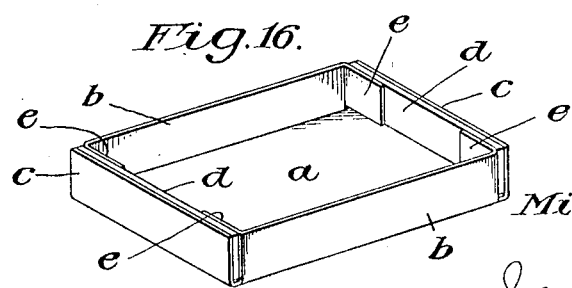

The invention comprises various features of construction and combinations of parts which will be hereinafter described and claimed. In the drawings—Figure 1 is a side elevation of a part of a box-making machine embodying the preferred form of my invention. Fig. 2 is a detail of a part of a device for applying glue to the main or body strip at the places where the reinforcing end sections are attached. Fig. 3 is a transverse vertical section through the machine, as on the line 3—3 of Fig. 1. Fig. 4 is a view of a part of Fig. 3 on a larger scale, showing more clearly the means for feeding the reinforcing strip and for cutting sections therefrom and applying them to the main or body strip. In this view the cutting and setting head is in down position below the overhanging end of the reinforcing strip. Fig. 5 is a similar section of the cutting and setting head and adjuncts, showing the head in its raised position as applying the severed reinforcing section to the body strip. Fig. 6 is a transverse section through the upper portion of the head, its vertical guides and the guides for the reinforcing strip, as on the line 6—6 of Fig. 4. Fig. 7 is a transverse vertical section, as on the line 7—7 of Fig. 4. Fig. 8 illustrates, in perspective, a part of a device for applying glue to the reinforcing end sections at the spots where the inturned corners of the box sides are attached. Fig. 9 illustrates in side elevation the cam and lever mechanism for operating said device. Fig. 10 is a view of a part of Fig. 3 on a larger scale, showing more clearly the feeding, cutting and box forming devices. Fig. 11 is a detail side elevation of the mechanism which folds the corners of the boxes. Fig. 11$^a$ is a sectional plan of the same. Fig. 12 illustrates a portion of the body strip, showing spaced reinforcing sections thereon, and also indicating a glue-bearing portion for the reception of a section. Fig. 13 illustrates a portion of the reinforced strip as slitted and scored. Fig. 14 is a plan of a box blank as severed from the strip. Fig. 15 is a plan of the completed box. Fig. 16 is a perspective view of the box.

Referring to the drawings, 10 designates the supporting frame structure, including the table 11, and 12 designates the main shaft journaled in suitable bearings in standards 13 on the table.

14 designates the strip of paper or pasteboard for the bodies of the boxes, which strip is drawn from a suitably-disposed roll, indicated at 15, Fig. 3. The strip is directed about a guide 15′ at one end of a horizontally-disposed bar 16 which extends longitudinally of and beneath the table, said bar being channeled on its underside for the reception and guidance of the strip therealong. A pressure roller 16′ supported by an arm 16² pivoted at the end of the table adjacent the guide 15′ bears upon the paper strip as it passes upon the guide and thus tends to keep the strip under tension. The strip passes to and about a roller 17 supported in an adjustable bearing bracket 17′ at the opposite end of the bar 16; thence about an elevated roller 18; thence horizontally to and between a pair of feeding and scoring rollers 19 by means of which the free end of the strip to which glue has been previously applied at suitable spots, is appropriately scored and intermittently advanced to coördinated blank cutting and forming mechanisms.

The paper in advance of the feed rollers passes through a guide path between two spaced plates 21, across which reciprocate at predetermined intervals punches 22 that appropriately slit the paper at the portions thereof, (as at 23, Fig. 13) where the side corners of the boxes are to be folded. The punches are carried by a plunger 24 which is connected by means of a link 25 with one arm of a rocker lever 26, the other arm of which is provided with a roller 27 which runs in the cam groove of a cam 28 on the main shaft.

The cutting knife 29 for severing the scored and slitted blank lengths from the end of the strip is carried by a vertically reciprocating cross-head 29' which is connected by means of a link 30 with the rocker-lever 26. The severed blank is supported upon a plate 31 having therethrough a rectangular opening 32 in vertical alinement with a former 33 carried by a vertically-reciprocating frame 34. The side members of this frame are provided with rollers 35 which rest upon cams 36 on the main shaft; the contour of the cams being such that when the blank is imposed over the opening of the plate 31 the former 33 is caused to descend a short distance so as to force the blank down into the opening and thus cause the side edges of the blank to be folded up to form the sides of the box. A series of suitably-disposed fingers 36' are mounted to reciprocate toward and from the respective slitted ends of the bent-up sides of the blank, such fingers in their inward movement folding the corner ends inward at right angles or substantially so to the sides. These fingers are carried by slides 37 having anti-friction rollers 38 which embrace appropriate cams 39 on the main shaft.

Beneath the opening of the plate 31 are successively presented the hollow links 40 of a chain which is intermittently impelled by a reciprocating gravity dog 41 (Fig. 1) which enters and advances the successive links. This dog is pivoted to a slide block 42 having anti-friction rollers 43 which embrace an appropriate cam 44 on the main shaft. As each link is brought under the opening of the plate 31 the former 33 is further depressed, thus forcing the blank down through the opening and into the link, and perforce folding up the ends of the blank and completing the box. This done the cams 36 operate to raise the former bearing frame 34 to its original position. The boxes are thus successively formed and entered into the consecutive links of the chain, remaining therein until the glue has hardened; whereupon the completed boxes are ejected from the links into a discharge chute 44' by the action of a vertically reciprocating plunger 44² on the successive boxes.

The mechanism above described is similar in construction and operation to that shown and described in the patent aforesaid.

According to my invention I secure to the strip of material 14 at regular intervals apart reinforcing sections 45 of paste-board or other suitable material, which intervals and the dimensions of the sections are such that when the strip is slitted near its longitudinal edges each section occupies the space between each pair of parallel slits, as illustrated in Fig. 13, so that when the strip is transversely severed into blanks by the knife 29 the reinforcing section is equally divided into two parts, one being on the end portion of one blank and the other on the adjacent end portion of the succeeding blank. Glue is suitably applied to the said sections, before their severance, (as indicated at 46, Fig. 13) so that when the blank is folded as above described the ends of the box are effectually reinforced and stiffened by the sections.

The reinforcing sections 45 are successively severed from a strip 46 of paste-board or the like drawn from a suitably-disposed roll. The strip passes around a roller 47 at the foot of the main frame; thence to and upon a longitudinally channeled bed 48 supported beneath the table. The paper enters between a pair of feed-rollers 49 at the front of the table, a curved guide 50 for the paper adjacent the rollers being provided. The rollers, which are mounted to turn in brackets in the main frame, are provided with intermeshing gear wheels 51. One of the rollers bears a ratchet wheel 52 with the teeth of which engages a spring-pressed pawl 53 on a rocker arm 54. This arm is connected by means of a link 55 with an arm 56 extending rearwardly from a vertically-reciprocative cross-head 57 mounted on guide rods 58 depending from the table. The cross-head is connected by means of a rod 59 with an eccentric 60 on a secondary shaft 61 having its bearings in the lower part of the main frame. The shaft 61 is geared with and driven from the main shaft in any suitable manner, so that the eccentric in its rotation reciprocates the cross-head 57 and its connections, thereby actuating the pawl and ratchet mechanism to effect intermittent rotation of the feed rollers. (See Figs. 3, 4 and 7). In the present instance the two shafts are provided with sprocket wheels 61' about which passes a sprocket chain 61².

Supported by posts 62 rising from the cross-head is a bar 63, which is thus reciprocative vertically toward and from the horizontal strip of paper beneath the table 11.

The rearward edge of this bar is constructed and arranged to move in close relation to the inner end of the bed 48, which end has mounted thereon a block 64 which spans the guide-channel in which the strip 46 of reinforcing paper is supported. When the bar 63 is in down position the free end of the strip 46 is projected across the path of the bar, as illustrated in Figs. 3 and 4, and hence in the upward stroke of the bar such projected end is severed thereby against the opposing edge of the block 64, and the section is thence carried upward by the bar into close contact with the opposing strip 14. (See Fig. 5.) Glue having previously been applied as hereinafter described to the surface portion of the strip 14 against which the reinforcing section is set and pressed by the bar, such section adheres to said strip.

The upper curved end of a spring finger 65 overhangs the projecting end of the paper strip 46 and holds it in the path of and upon the cutting and setting bar preparatory to and during the severance of the strip. This finger is caused to recede from the top of the bar by the pressure of the latter against the finger. The lower end of the finger is secured to a collar 66 loosely mounted on a rod 67 which is affixed at one end to a bracket 68 on the main frame. A spring 69 encircling the rod is secured at one end to this collar and at the other end to a collar 70 fast on the rod, so that the torsional action of the spring tends to project the finger into the path of the cutting and setting bar. (See Figs. 4 and 7). Beneath the finger 65 is another spring finger 71, the free end of which is normally projected into the path of the bar 63. The opposite end of this finger 71 is secured, similarly to the finger 65, to a spring-actuated collar 72 on a rod 73 projecting from the bracket 68. The lower finger is so disposed that as the bar descends the free end of such finger scrapes upon the top surface of the bar and removes therefrom any deposit of glue which may be present and also any sections 45 that may not have adhered to the main strip. The finger 65 may be termed a stripper.

74 designates two vertically-disposed plates located at the respective sides of the cutting and setting portion of the bar 63 so as to provide parallel edge guides for the projecting strip of paper 46 preparatory to its severance, and also for the severed section during its elevation. The forward edges of the guide plates are inwardly flanged, as at 75, to provide an end stop and guide for the projecting strip end and severed section. The plates are longitudinally slotted, as at 76, for the free passage and movement of the reduced end extensions 77 of the bar. (See Fig. 6.)

78 designates a glue pot supported beneath the table 11 at the front of the machine; (that is, at the left hand side of Fig. 3), said pot having a steam chamber 79 to maintain the glue at the proper consistency. Within the pot is a vertically-movable structure by means of which the glue is applied to the under surface of the strip at the spots 20 (Fig. 12) where the reinforcing sections are to be attached. The structure comprises a horizontally-disposed bar 80, one end of which is secured to an arm 81 depending from an angle piece 82 which is connected exteriorly of the pot to one end of an arm 83 projecting forwardly from the cutting and setting bar 63, the bar 80 thus being reciprocated by and with the bar 63. To the side of the bar 80, adjacent its inner or free end, are secured a series of relatively spaced angular fingers 81 (Fig. 2) the up-projecting limbs of which provide at their upper extremities a series of spaced glue-applying surfaces of small area on the same horizontal plane. These surfaces when the bar is raised contact with the opposing under surface of the strip 14 and apply lines of glue thereto; and at the same time by virtue of their peculiar construction and arrangement the fingers permit the excess glue to drain freely therefrom.

82' designates a glue pot supported beneath the table 11, at the rear of the machine; (that is, at the right hand side of Fig. 3), said pot having therein a suitable device for applying glue to the under surface of the successive reinforcing sections on the body strip at those portions of the sections where the corner folds of the sides of the completed boxes are secured. This pot and the glue-applying devices associated therewith, are substantially similar to the means shown in Patent No. 554,975 for applying the glue to the body strip, as follows: 84 is a vertically-movable bar within the glue pot, provided with suitably-located glue-applying fingers 84'; and 85 is a depending plunger to the foot of which the bar 84 is secured, said plunger being guided in a hollow post 86 on the table. The upper end of the plunger is pivotally connected to the longer arm of a lever 87, the shorter arm of which is provided with a roller 88 which is maintained in operative contact with a cam 89 on the main shaft by means of a suitably-disposed spring 90. (See Fig. 9). The cam and spring coöperate to oscillate the lever 87, and thereby effect the timely vertical reciprocation of the plunger and the glue-applying devices carried thereby.

The body strip 14 bearing its spaced reinforcing section 45 supplied with glue as above mentioned, passes to the punches 22 which punch in the strip parallel slits 23, at the respective ends of the successive sections; thence the strip passes to the score rollers 19 and is scored thereby longitudinally, as at 91, and transversely as at 92 (Fig. 13) to define the fold lines of the blanks; thence the end of the strip passes to the forming mechanism and beneath the cutting knife 29, the reinforced sections being in such relation to the knife that the severance is effected along the median line of the section, so that when the sides, corner portions and ends of the blank are operated upon by the forming mechanism a box is produced having reinforced and stiffened end walls, as illustrated in Figs. 15 and 16. In these figures $a$ denotes the bottom of the box; $b$ the side walls; $c$ the end walls having on and throughout their inner sides the reinforcing pieces $d$, and $e$ the side corner folds to which the ends of the reinforcing pieces are fastened.

It is to be understood that my invention is not limited to the specific construction herein shown and decribed, as the mechanism may be variously modified without departure from the spirit of the invention.

I claim—

1. The combination of means for feeding box material, means for applying sections of reinforcing material thereto in spaced relation to each other, and means for severing the box material through the said sections to produce box blanks having reinforced end portions.

2. The combination of means for feeding box material, means for feeding reinforcing material, means for severing sections from the latter material and securing them in spaced relation to each other on the box material, and means for severing the box material through the said sections to produce box blanks having reinforced end portions.

3. The combination of means for progressively feeding a strip of box material, means for progressively feeding a strip of reinforcing material, means, including a reciprocative head, for severing successive sections from the latter strip and applying them in spaced relation to each other on the strip of box material, and means for severing the strip of box material through the said sections to produce box blanks having reinforced end portions.

4. The combination of means for progressively feeding a strip of box material, means for progressively feeding a strip of reinforcing material, a guide member through which the leading end of the latter strip is intermittently projected, a head reciprocative at intervals across the plane of the successive projecting end portions of the strip and toward and from the strip of box material, said head co-acting with the said member to sever such end portions from the strip of reinforcing material and apply the sections thus produced to the strip of box material in spaced relation to each other, and means for severing the strip of box material through the end portions thus applied thereto.

5. The combination of means for feeding a strip of box material, means for applying sections of reinforcing material thereto in spaced relation to each other, said sections being of less length than the width of the strip, means for slitting the strip at the ends of the sections, and means for severing the strip through the said sections to produce box blanks each comprising a body portion, reinforced end wall portions, side wall portions, and side corner portions at the ends of such reinforced portions.

6. The combination of means for feeding a strip of box material, means for applying sections of reinforcing material thereto in spaced relation to each other, said sections being of less length than the width of the strip, means for slitting the strip at the ends of the sections, means for severing the strip through the said sections to produce box blanks each comprising a body portion, reinforced end wall portions, side wall portions, and side corner portions at the ends of such reinforced portions, and means for folding the successive blanks to produce boxes having reinforced end walls.

7. The combination of means for progressively feeding a strip of box material, means for progressively feeding a strip of reinforcing material, means, including a reciprocative head, for severing successive sections from the end of the latter strip and applying them in spaced relation to each other to the strip of box material, means for severing the strip of box material through the said sections to produce box blanks having reinforced end portions, and yielding means for holding the end of the strip of reinforcing material in the path of the head.

8. The combination of means for progressively feeding a strip of box material, means for progressively feeding a strip of reinforcing material, means, including a reciprocative head, for severing successive sections from the end of the latter strip and applying them in spaced relation to each other to the strip of box material, means for severing the strip of box material through the said sections to produce box blanks having reinforced end portions, and parallel guide members for the section in its passage to the strip of box material.

9. The combination of means for feeding a strip of box material, means for applying an adhesive to the surface of said strip at intervals thereon, means for feeding a strip of reinforcing material, means, including a reciprocative head, for severing successive sections from the latter strip and applying them to the adhesive bearing portions thereof, a yielding stripper member movable upon and from the head, and means for severing the strip of box material through the said sections to produce box blanks having reinforced end portions.

10. The combination of means for feeding a strip of box material, means for applying an adhesive to the surface of said strip at intervals, means for applying sections of reinforcing material to the adhesive bearing portions of the strip, means for applying adhesive to the said sections, means for severing the strip to produce box blanks having reinforced end portions, and means for folding the blanks to produce boxes having reinforced ends.

11. The combination of means for feeding a strip of box material, means for applying an adhesive to the surface of said strip at intervals thereon, means for applying sections of reinforcing material to the adhesive-bearing portions of said strip, and connections whereby the section-applying means and the adhesive applying means are operated concurrently.

12. The combination of means for feeding a strip of box material, means for applying an adhesive to the surface of said strip at intervals thereon, means for applying sections of reinforcing material to the adhesive-bearing portions of said strip, a second means for applying an adhesive to the reinforcing sections on the strip, and connections whereby the section-applying means and the second adhesive-applying means are operated concurrently.

13. The combination of means for feeding a strip of box material, means for applying an adhesive to the surface of said strip at intervals thereon, means for applying sections of reinforcing material to the adhesive-bearing portions of said strip, a second means for applying an adhesive to the reinforcing sections on the strip, and connections whereby the section-applying means and both adhesive-applying means are operated concurrently.

14. The combination of means for feeding a strip of box material, means for applying an adhesive to the surface of said strip at intervals thereon, means for feeding a strip of reinforcing material, means, including a reciprocative head, for severing successive sections from the latter strip and applying them to the adhesive-bearing portions thereof, and connections whereby said head and adhesive-applying means are operated concurrently.

15. The combination of means for feeding a strip of box material, means for applying an adhesive to the surface of said strip at intervals thereon, means for feeding a strip of reinforcing material, means, including a reciprocative head, for severing successive sections from the latter strip and applying them to the adhesive-bearing portions thereof, a second means for applying an adhesive to the reinforcing sections on the strip, and connections whereby the said head and the second adhesive-applying means are operated concurrently.

16. The combination of means for feeding a strip of box material, means for applying an adhesive to the surface of said strip at intervals thereon, means for feeding a strip of reinforcing material, means, including a reciprocative head, for severing successive sections from the latter strip and applying them to the adhesive bearing portions thereof, means for applying an adhesive to the reinforcing sections on the strip, and connections whereby the said head and both adhesive-applying means are operated concurrently.

Signed at Barberton in the county of Summit and State of Ohio this 12th day of June A. D. 1915.

MICHAEL PARIDON.

Copies of this patent may be obtained for five cents each, by addressing the "Commissioner of Patents, Washington, D. C."